United States Patent
Kim et al.

(10) Patent No.: US 9,979,014 B2
(45) Date of Patent: May 22, 2018

(54) COMPOSITE CATHODE ACTIVE MATERIAL, CATHODE AND LITHIUM BATTERY COMPRISING THE SAME, AND PREPARATION METHOD THEREOF

(71) Applicant: Samsung SDI Co., Ltd., Yonsin-si (KR)

(72) Inventors: Min-Han Kim, Yongin-si (KR); Joong-Ho Moon, Yongin-si (KR); Han-Eol Park, Yongin-si (KR); Kyoung-Hyun Kim, Yongin-si (KR); Do-Hyung Park, Yongin-si (KR); Yu-Mi Song, Yongin-si (KR); Ming-Zi Hong, Yongin-si (KR); Jeong-Hoon Kim, Yongin-si (KR); Dong-Jin Kim, Yongin-si (KR); Jeon-Jin Choi, Yongin-si (KR); Gyu-Ran Jeon, Yongin-si (KR); Sun-Ho Kang, Yongin-si (KR)

(73) Assignee: SAMSUNG SDI Co., LTD., Yongin-si, Gyeonggi-do (KR)

( * ) Notice: Subject to any disclaimer, the term of this patent is extended or adjusted under 35 U.S.C. 154(b) by 266 days.

(21) Appl. No.: 14/472,190

(22) Filed: Aug. 28, 2014

(65) Prior Publication Data
US 2015/0171423 A1    Jun. 18, 2015

(30) Foreign Application Priority Data
Dec. 17, 2013 (KR) .................. 10-2013-0157523

(51) Int. Cl.
H01M 4/36    (2006.01)
H01M 4/525    (2010.01)
(Continued)

(52) U.S. Cl.
CPC .......... *H01M 4/366* (2013.01); *H01M 4/131* (2013.01); *H01M 4/1391* (2013.01);
(Continued)

(58) Field of Classification Search
None
See application file for complete search history.

(56) References Cited

U.S. PATENT DOCUMENTS

2002/0071990 A1    6/2002    Kweon et al.
2003/0138697 A1    7/2003    Leising et al.
(Continued)

FOREIGN PATENT DOCUMENTS

JP    2004-039620 A    2/2004
JP    2008-071622 A    3/2008
(Continued)

OTHER PUBLICATIONS

Solid State Ionics 120 (1999) pp. 155-161(Dec. 4, 2008).
Office Action dated Dec. 21, 2016, issued in corresponding KR Application No. 10-2013-157523.

*Primary Examiner* — Alix Eggerding
(74) *Attorney, Agent, or Firm* — Knobbe, Martens, Olson & Bear, LLP (57) ABSTRACT

A composite cathode active material including a core comprising a lithium compound, and a coating layer formed on at least one portion of the core and including at least two oxide phases having different structures, a cathode and a lithium battery including the same, and a method of preparing the composite cathode active material.

19 Claims, 4 Drawing Sheets

----- $LiCoO_2$ PHASE, $Li_{0.49}CoO_2$ PHASE, $Li_{0.5}Co_{1.1}O_2$ PHASE, and $Co_3O_4$ PHASE (51) Int. Cl.
*H01M 4/1391* (2010.01)
*H01M 4/131* (2010.01)
*H01M 10/0525* (2010.01)

(52) U.S. Cl.
CPC ....... *H01M 4/525* (2013.01); *H01M 10/0525* (2013.01); *H01M 2220/30* (2013.01)

(56) References Cited

U.S. PATENT DOCUMENTS

| | | | | |
|---|---|---|---|---|
| 2005/0260495 | A1* | 11/2005 | Onnerud | C01G 53/003 429/231.1 |
| 2006/0246352 | A1* | 11/2006 | Kweon | C01G 45/1228 429/231.95 |
| 2008/0182170 | A1* | 7/2008 | Rong | H01M 4/0404 429/223 |

FOREIGN PATENT DOCUMENTS

| | | |
|---|---|---|
| JP | 2008-071623 A | 3/2008 |
| JP | 05-040074 B2 | 7/2012 |
| JP | 2012-252844 A | 12/2012 |
| KR | 10-1999-0051812 A | 7/1999 |
| KR | 10-2000-0025555 A | 5/2000 |
| KR | 10-2002-0087627 A | 11/2002 |
| KR | 2012-0121235 | 11/2012 |
| WO | WO 2012/171780 | 12/2012 |

\* cited by examiner

COMPOSITE CATHODE ACTIVE MATERIAL, CATHODE AND LITHIUM BATTERY COMPRISING THE SAME, AND PREPARATION METHOD THEREOF

CROSS-REFERENCE TO RELATED APPLICATIONS

This application claims the benefit of Korean Patent Application No. 10-2013-0157523, filed on Dec. 17, 2013, in the Korean Intellectual Property Office, the disclosure of which is incorporated herein in its entirety by reference.

BACKGROUND

Field

One or more embodiments relate to composite cathode active materials, cathodes and lithium batteries including the same, and methods of preparing the composite cathode active materials, and to composite cathode active materials having a reduced amount of lithium remaining on the surface thereof, high initial capacity, high rate capability, and long lifespan, cathodes and lithium batteries including the same, and methods of preparing the composite cathode active materials.

Description of the Related Technology

Lithium batteries, particularly, lithium ion batteries (LIBs) have been used as a power source of portable electronic devices due to high energy density and design efficiency. Recently, as lithium ion batteries have been used as power sources of electronic vehicles or power storage in addition to portable electronic devices, much research into materials for lithium ion batteries having high energy density and long lifespan has been conducted.

Among these materials, Li—Co oxides, such as $LiCoO_2$, have been widely used as cathode active materials. However, due to maldistribution and scarcity of cobalt, a stable supply thereof may not be guaranteed and manufacturing costs increase.

Thus, Li—Ni composite oxides or Li—Mn composite oxides instead of expensive Co have been developed as cathode active materials. Particularly, research into Li—Ni composite oxides is increasing in order to jump over limitation of Li—Mn composite oxides in light of a price, a stability, and a capacity.

However, since a large amount of lithium is deintercalated from the Li—Ni composite oxides during charging, the Li—Ni composite oxides have unstable structures which relatively easily collapse with respect to Li—Mn composite oxides, and capacity thereof deteriorates relatively severely during charging and discharging. Furthermore, since oxygen may also be deintercalated simultaneously when lithium is deintercalated from the cathode active material, capacity of the cathode active material may deteriorate, and the cathode active material may have relatively low thermal stability due to reaction with an electrolyte with respect to Li—Mn composite oxides.

Therefore, there is a need to stabilize the Li—Ni composite oxides to improve battery performance by reducing an amount of residual lithium therein and inhibiting side reactions between the composite cathode active material and an electrolyte.

SUMMARY

One or more embodiments include composite cathode active materials having a reduced amount of lithium remaining on the surface thereof.

One or more embodiments include cathodes including the composite cathode active materials.

One or more embodiments include lithium batteries having high discharge capacity, high rate capability, and long lifespan.

One or more embodiments include methods of preparing a composite cathode active material having a reduced amount of lithium remaining on the surface thereof.

Additional aspects will be set forth in part in the description which follows and, in part, will be apparent from the description, or may be learned by practice of the presented embodiments.

According to one or more embodiments, a composite cathode active material includes a core including a lithium compound, and a coating layer formed on at least one portion of the core, wherein the coating layer comprises at least two oxide phases having different structures.

The coating layer may be a layer coated with at least two oxide phases having different structures in the form of islands.

Lithium remaining on the surface of the core may partially be involved in reactions with the coating layer to form the at least two oxide phases having different structures.

An amount of lithium remaining on the surface of the core may be less than about 0.20% by weight.

The coating layer may include a spinel-structured oxide phase and a layer-structured oxide phase.

The coating layer may include at least two oxide phases selected from the group consisting of $LiCoO_2$, $Li_{0.49}CoO_2$, $Li_{0.5}Co_{1.1}O_2$, and $Co_3O_4$.

The core including the lithium compound may be a Li—Ni composite oxide having at least about 50% of Ni.

The core comprising the lithium compound is a Li—Ni composite oxide represented by Formula 1 below:

$$Li_aNi_x(M)_yO_2 \qquad \text{Formula 1}$$

wherein M includes at least one selected from the group consisting of cobalt (Co), manganese (Mn), chromium (Cr), titanium (Ti), copper (Cu), iron (Fe), aluminum (Al), vanadium (V), and tungsten (W), wherein $0.9 \leq a \leq 1.2$, $0.5 \leq x \leq 1.0$, and $0 \leq y \leq 0.5$.

According to one or more embodiments, a cathode includes the composite cathode active material.

According to one or more embodiments, a lithium battery includes a cathode including a cathode active material, an anode including an anode active material, an electrolyte interposed between the cathode and the anode, wherein the cathode active material includes the composite cathode active material.

According to one or more embodiments, a method of preparing a composite cathode active material includes preparing a core by heat-treating a lithium compound precursor, and forming a coating layer on at least one portion of the core by applying a transition metal hydroxide to the core, and heat-treating the core with transition metal hydroxide, wherein the coating layer includes at least two oxide phases having different structures.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a composite cathode active material, a cathode and a lithium battery including the same, and a method of preparing the composite cathode active material according to embodiments will be described in detail. The present embodiments may, however, be embodied in many different forms and should not be construed as being limited to the embodiments set forth herein; rather, these embodiments are provided so that this disclosure will be thorough and complete, and will fully convey the concept of the present embodiments to those of ordinary skill in the art.

A composite cathode active material according to an embodiment includes a core including a lithium compound and a coating layer formed on at least one portion of the core. The coating layer includes at least two oxide phases having different structures.

The composite cathode active material may have a stable structure and prevent side reactions between the composite cathode active material and an electrolyte due to the coating layer including at least two oxide phases having different structures formed on at least one portion of the core, and accordingly, a lithium battery including the composite cathode active material may have improved battery performance such as an improved initial capacity, rate capability, and lifespan characteristics. The coating layer may be a layer coated with at least two oxide phases having different structures and which are in the form of islands. The coating layer may be formed as a composite form of islands of at least two oxide phases having different structures.

Figure 1:
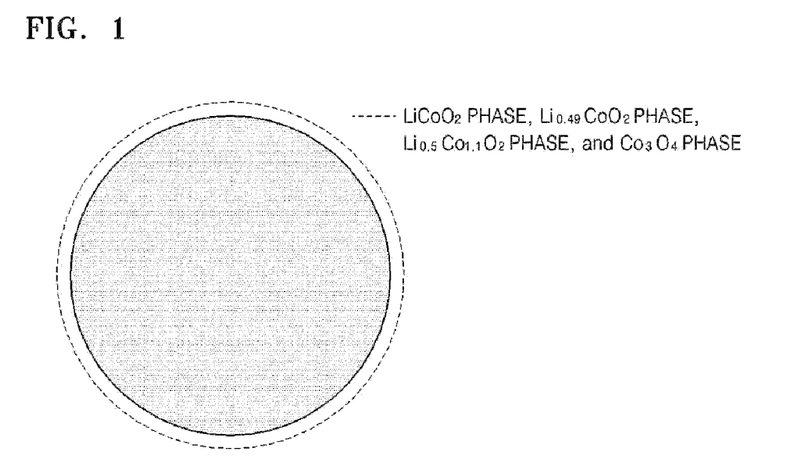
FIG. 1 is a schematic diagram of a composite cathode active material according to an embodiment.

FIG. 1 is a schematic diagram of a composite cathode active material according to an embodiment. Referring to FIG. 1, in the composite cathode active material, the coating layer is formed as a composite of at least two oxide phases having different structures on the core including a lithium compound in the form of islands.

A composite cathode active material including the coating layer in the form of islands may have a high discharge capacity and low gas generation.

Lithium remaining on the surface of the core may partially be involved in reactions with the coating layer so as to form at least two oxide phases having different structures. Here, lithium remaining on the surface of the core may be derived from a lithium compound such as $Li_2CO_3$, LiOH, and $Li_2SO_4$. The coating layer may reduce an amount of lithium remaining on the surface of the core and inhibit side reactions between the composite cathode active material and an electrolyte, thereby reducing generation of gas such as $CO_2$. The amount of lithium remaining on the surface of the core may be less than about 0.20% by weight. For example, the amount of lithium remaining on the surface of the core may be about 0.15% by weight.

The coating layer may include a spinel-structured oxide phase and a layer-structured oxide phase. For example, the coating layer may include at least two oxide phases selected from the group consisting of layer-structured $LiCoO_2$, spinel-structured $Li_{0.49}CoO_2$, $Li_{0.5}Co_{1.1}O_2$, and $Co_3O_4$. When the coating layer includes a layer-structured $LiCoO_2$ oxide phase, a composite cathode active material including the coating layer may have an improved discharge capacity, thereby having improved lifespan characteristics. When the coating layer includes spinel-structured $Li_{0.49}CoO_2$ and/or $Li_{0.5}Co_{1.1}O_2$ oxide phases, a composite cathode active material including the coating layer may have a stable structure, thereby inhibiting side reactions between the composite cathode active material and an electrolyte.

The coating layer may have a thickness of about 5 nm to about 30 nm. When the thickness of the coating layer of the composite cathode active material is within the range described above, lifespan characteristics of a lithium battery including the composite cathode active material may be improved.

The core including the lithium compound may include a Li—Ni composite oxide. The core including the lithium compound may be a Li—Ni composite oxide having at least about 50% of Ni.

For example, the core including the lithium compound may be a Li—Ni composite oxide represented by Formula 1 below.

$Li_aNi_x(M)_yO_2$                Formula 1

In Formula 1, M includes at least one selected from the group consisting of cobalt (Co), manganese (Mn), chromium (Cr), titanium (Ti), copper (Cu), iron (Fe), aluminum (Al), vanadium (V), and tungsten (W), 0.9≤a≤1.2, 0.5≤x≤1.0, and 0≤y≤0.5.

In general, the Li—Ni composite compound generates two electrons during charging in which intercalation of lithium ions occurs as shown in Reaction Scheme 1 below. Thus, the discharge capacity of the Li—Ni composite compound tends to increase as the content of Ni increases compared to other elements generating one electron such as cobalt (Co) and manganese (Mn). Thus, when the core is a Li—Ni composite oxide having at least about 50% of Ni as shown in Formula 1, high discharge capacity may be obtained.

$Ni^{2+} \rightarrow Ni^{4+} + 2e^-$                Reaction Scheme 1

The core including the lithium compound may have an average particle diameter of about 1 μm to about 15 μm. For example, the core including the lithium compound may have an average particle diameter of about 1 μm to about 10 μm. When the average particle diameter of the core is within the range described above, a stable structure, high discharge capacity, and high rate capability may be obtained.

A cathode according to another embodiment includes the composite cathode active material.

A lithium battery according to another embodiment includes a cathode including a cathode active material, an anode including an anode active material, and an electrolyte interposed between the cathode and the anode. The cathode active material may include the composite cathode active material as described above.

Figure 3:
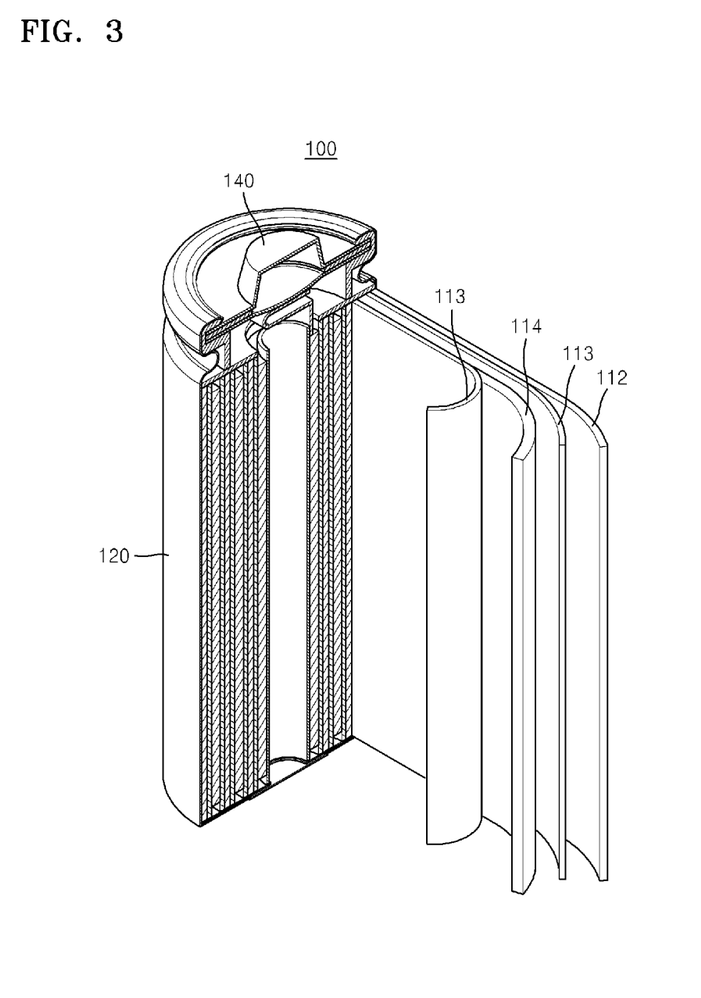
FIG. 3 is an exploded perspective view a lithium battery 100 according to an embodiment.

FIG. 3 is an exploded perspective view of a lithium battery 100 according to an embodiment. Although FIG. 3 illustrates a cylindrical battery, the embodiments is not limited thereto. Any lithium batteries having a square pillar shape or a pouch shape may also be used.

Lithium batteries may be classified into lithium ion batteries, lithium ion polymer batteries, and lithium polymer batteries according to the types of separator and electrolyte. In addition, lithium batteries may be classified into a cylindrical type, a rectangular type, a coin type, and a pouch type according to the shape of battery, and may also be classified into a bulk type and a thin film type according to the size of battery. The shape of the lithium battery according to an embodiment is not particularly limited, and structures of the lithium batteries and preparation methods thereof are well known in the art, and thus detailed descriptions thereof will not be given herein.

Referring to FIG. 3, the lithium battery 100 has a cylindrical shape and includes an anode 112, a cathode 114, a separator 113 interposed between the anode 112 and the cathode 114, an electrolyte (not shown) impregnated into the anode 112, the cathode 114, and the separator 113, a battery case 120, and a sealing member 140 to seal the battery case 120. The lithium battery 100 is manufactured by sequentially stacking the anode 112, the separator 113 and the cathode 114 upon one another, winding the stack in a spiral form, and accommodating the wound stack in the battery case 120.

The anode 112 includes a current collector and an anode active material layer formed on the current collector.

The current collector may include stainless steel, nickel, aluminum, iron, copper, titanium, and the like and may have a shape such as a thin film shape, a plate shape, a mesh (grid) shape, and a foam (sponge) shape, without being limited thereto.

As the anode active material forming the anode active material layer, lithium metal, a metal that is alloyable with lithium, a transition metal oxide, and a material that allows doping or undoping of lithium, or a material that allows reversible intercalation and deintercalation of lithium ions may be used.

Examples of the transition metal oxide may include vanadium oxide and lithium vanadium oxide. Examples of the material that allows doping or undoping of lithium may include Si, $SiO_x$ ($0<x\leq2$), an Si—Y alloy, where Y is an alkali metal, an alkali earth metal, Group XIII-Group XVI elements, a transition metal, a rare earth element, or any combination thereof (except for Si), Sn, $SnO_2$, an Sn—Y alloy, where Y is an alkali metal, an alkali earth metal, Group XIII-Group XVI elements, a transition metal, a rare earth element, or any combination thereof (except for Sn), where at least one of these materials may be used in combination with $SiO_2$. In this regard, Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof.

The material that allows reversible intercalation and deintercalation of lithium ions may be a carbonaceous material, and any carbonaceous anode active material commonly used in lithium batteries may be used. Examples of the carbonaceous material may include crystalline carbon, amorphous carbon, or mixtures thereof. Examples of the crystalline carbon include graphite such as natural graphite or artificial graphite that are in amorphous, plate, flake, spherical, or fibrous form. Examples of the amorphous carbon include soft carbon (carbon sintered at low temperatures), hard carbon, meso-phase pitch carbides, sintered corks, and the like.

However, the anode active material is not limited thereto, and any material capable of intercalating/deintercalating lithium and commonly used as an anode active material may also be used.

The anode 112 is prepared by mixing an anode active material, a conductive agent, a binder, and a solvent to prepare an anode active material composition, and preparing an anode plate by directly coating the composition on a Cu current collector. Alternatively, the anode active material composition may be cast on a separate support, and then a film separated from the support is laminated onto a Cu current collector to prepare the anode plate.

Examples of the conductive agent may include a carbonaceous material such as carbon black, graphite particulate, natural graphite and artificial graphite, acetylene black, ketjen black, carbon fiber, carbon nanotube; a metal such as copper, nickel, aluminum, and silver, each of which may be used in powder, fiber, or tube form; and conductive polymers such as polyphenylene derivatives, without being limited thereto. Any other materials commonly used in the art as the conductive agent may also be used.

Examples of the binder may include a vinylidene fluoride/hexafluoropropylene copolymer, polyvinylidene fluoride, polyacrylonitrile, polymethylmethacrylate, polytetrafluoroethylene (PTFE), mixtures thereof, and a styrene butadiene rubber polymer, without being limited thereto. Examples of the solvent include N-methylpyrrolidone (NMP), acetone, water, and the like, without being limited thereto. Any binder and any solvent commonly used in the art may also be used. The amount of the anode active material, the conductive agent, the binder, and the solvent may be the same as those commonly used in lithium batteries. At least one of the conductive agent, the binder, and the solvent may be not used according to the use and the structure of the lithium battery.

The cathode 114 includes a current collector and a cathode active material layer formed on the current collector.

The current collector may include aluminum (Al) and may have a thin film shape, a plate shape, a mesh (grid) shape, and a foam (sponge) shape.

The cathode active material forming the cathode active material layer may be a composite cathode active material including a core including a lithium compound and a coating layer formed on at least one portion of the core. The coating layer includes at least two oxide phases having different structures. The composite cathode active material may have a stable structure and prevent side reactions between the composite cathode active material and an electrolyte due to the coating layer including at least two oxide phases having different structures and formed on at least one portion of the core. Accordingly, a lithium battery including the composite cathode active material may have improved battery performance such as initial capacity, rate capability, and lifespan characteristics. The composition and average particle diameter of the core including the lithium compound and the shape, composition ratio, structure, and thickness of the coating layer are as described above, and thus detailed descriptions thereof will not be given herein.

The cathode active material may be any material commonly used in the art in addition to the composite cathode active material. Although the cathode active material commonly used in the art is not particularly limited thereto, a material that allows reversible intercalation and deintercalation of lithium ions may be used. In particular, the cathode active material may be at least one composite oxide of lithium and a metal selected from the group consisting of cobalt, manganese, nickel, and a combination thereof. Examples of the cathode active material may include any compound represented by $Li_aA_{1-b}B_bD_2$ (0.90≤a≤1.8, and 0≤b≤0.5); $Li_aE_{1-b}B_bO_{2-c}D_c$ (0.90≤a≤1.8, 0≤b≤0.5, 0≤c≤0.05); $LiE_{2-b}B_bO_{4-c}D_c$ (0≤b≤0.5, 0≤c≤0.05); $Li_aNi_{1-b-c}Co_bB_cD_\alpha$ (0.90≤a≤1.8, 0≤b≤0.5, 0≤c≤0.05, 0≤α≤2); $Li_aNi_{1-b-c}Co_bB_cO_{2-\alpha}F_\alpha$ (0.90≤a≤1.8, 0≤b≤0.5, 0≤c≤0.05, 0≤α≤2); $Li_aNi_{1-b-c}Co_bB_cO_{2-\alpha}F_2$ (0.90≤a≤1.8, 0≤b≤0.5, 0≤c≤0.05, 0≤α≤2); $Li_aNi_{1-b-c}Mn_bB_cD_\alpha$ (0.90≤a≤1.8, 0≤b≤0.5, 0≤c≤0.05, 0≤α≤2); $Li_aNi_{1-b-c}Mn_bB_cO_{2-\alpha}F_\alpha$ (0.90≤a≤1.8, 0≤b≤0.5, 0≤c≤0.05, 0≤α≤2); $Li_aNi_{1-b-c}Mn_bB_cO_{2-\alpha}F_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $LiQO_2$; $LiQS_2$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); or $LiFePO_4$.

Examples of the cathode active material commonly used in the art may include $LiMn_2O_4$, $LiNi_2O_4$, $LiCoO_2$, $LiNiO_2$, $LiMnO_2$, $Li_2MnO_3$, $LiFePO_4$, $LiNi_xCo_yO_2$ (0≤x≤0.15, 0≤y≤0.85), $V_2O_5$, and TiS.

In the formulae above, A is selected from the group consisting of nickel (Ni), cobalt (Co), manganese (Mn), or any combination thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, or any combination thereof; D is selected from the group consisting of oxygen (O), fluorine (F), sulfur (S), phosphorus (P), or any combination thereof; E is selected from the group consisting of cobalt (Co), manganese (Mn), or any combination thereof; F is selected from the group consisting of fluorine (F), sulfur (S), phosphorus (P), or any combination thereof; G is selected from the group consisting of aluminum (Al), chromium (Cr), manganese (Mn), iron (Fe), magnesium (Mg), lanthanum (La), cerium (Ce), strontium (Sr), vanadium (V), or any combination thereof; Q is selected from the group consisting of titanium (Ti), molybdenum (Mo), manganese (Mn), or any combination thereof; I is selected from the group consisting of chromium (Cr), vanadium (V), iron (Fe), scandium (Sc), yttrium (Y), or any combination thereof; and J is selected from the group consisting of vanadium (V), chromium (Cr), manganese (Mn), cobalt (Co), nickel (Ni), copper (Cu), or any combination thereof.

The cathode active material may be any cathode active material commonly used in the art having a coating layer, or a mixture of the compound and a compound having a coating layer. The coating layer may include a compound of a coating element selected from the group consisting of oxide, hydroxide, oxyhydroxide, oxycarbonate, and hydroxycarbonate of the coating element. These compounds forming the coating layer may be amorphous or crystalline. A coating element contained in the coating layer may be Mg, Al, Co, K, Na, Ca, Si, Ti, V, Sn, Ge, Ga, B, As, Zr, or a mixture thereof. A method of forming the coating layer may be any method, for example, a spray coating method, and an immersion method, which do not adversely affect physical properties of the cathode active material when a compound of such a coating element is used.

The cathode active material layer may further include a conductive agent and a binder. In order to prepare the cathode active material layer, a composite cathode active material, a conductive agent, a binder, and a solvent are mixed to prepare a composite cathode active material composition. The composite cathode active material composition may be directly coated onto an Al current collector and dried to prepare a cathode plate provided with the composite cathode active material layer. Alternatively, the composite cathode active material composition may be cast on a separate support, and then a film separated from the support is laminated onto an Al current collector to prepare a cathode plate provided with the composite cathode active material layer. In this regard, the conductive agent, the binder, and the solvent in the cathode active material composition may be the same as that in the anode active material composition or different. The amounts of the composite cathode active material, the conductive agent, the binder, and the solvent may be the same levels as those commonly used in a lithium battery. At least one of the conductive agent, the binder, and the solvent may not be used according to the use and the structure of the lithium battery.

If desired, a plasticizer may further be added to the anode active material composition and the cathode active material composition to form pores inside the electrode plates.

Any separator commonly used in the art may be used as the separator 113. The separator 113 having low resistance to migration of ions in the electrolyte and excellent electrolyte-retaining ability may be used. Examples of the separator 113 may include glass fiber, polyester, Teflon, polyethylene, polypropylene, polytetrafluoroethylene (PTFE), and a combination thereof, each of which may be a non-woven or woven fabric. For example, a windable separator including polyethylene or polypropylene may be used for a lithium ion battery. A separator with excellent organic electrolyte-retaining capability may be used for a lithium ion polymer battery. For example, the separator 113 may be manufactured in the following manner.

A polymer resin, a filler, and a solvent are mixed to prepare a separator composition. Then, the separator composition may be directly coated onto an electrode, and then dried to form a separator. Alternatively, the separator composition may be cast on a support and then dried to form a film, and the film, separated from the support, may be laminated onto an electrode to form the separator.

The polymer resin used to manufacture the separator may be any material commonly used as a binder for electrode plates. Examples of the polymer resin include a vinylidene-fluoride/hexafluoropropylene copolymer, polyvinylidene fluoride (PVDF), polyacrylonitrile, polymethylmethacrylate or any mixture thereof.

For example, the electrolyte may be an organic electrolyte. The organic electrolyte may be prepared by dissolving a lithium salt in an organic solvent.

Any organic solvent commonly used in the art may be used. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any lithium salt commonly used in the art. Examples of the lithium salt may include LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (x and y are each independently a natural number), LiCl, LiI, or any mixture thereof.

The lithium battery may be a large thin film battery. The lithium battery may be a lithium ion polymer battery. The separator 113 may be interposed between the cathode 114 and the anode 112 to form a battery assembly. The battery assembly may be stacked in a bi-cell structure and impregnated with an organic electrolyte. The resultant is put into a pouch and sealed, thereby completing the manufacture of a lithium ion polymer battery.

Alternatively, a plurality of battery assemblies may be stacked to form a battery pack, which may be used in any device requiring a high capacity battery and high output power, for example, in laptop computers, smart phones, electric vehicles, and the like.

The lithium battery may also be suitable for use as power sources for electric vehicles (EVs) due to a stable structure, high initial efficiency, high rate capability, and excellent lifespan characteristics. For example, the lithium battery may be applied to hybrid electric vehicles such as plug-in hybrid electric vehicles (PHEVs).

A method of preparing a composite cathode active material according to another embodiment includes preparing a core including a lithium compound; and forming a coating layer on at least one portion of the core by applying a transition metal hydroxide to the core and heat-treating the transition metal hydroxide. The coating layer may include at least two oxide phases having different structures.

A core is prepared by heat-treating a metal oxide precursor. For example, the core may be prepared in the following manner.

First, a metal oxide precursor is prepared by preparing an aqueous solution of a metal salt, followed by co-precipitation with a basic solution.

The metal salt may include at least one selected from the group consisting of nickel (Ni), cobalt (Co), manganese (Mn), chromium (Cr), titanium (Ti), copper (Cu), iron (Fe), aluminum (Al), vanadium (V), and tungsten (W). For example, the aqueous solution of the metal salt may include at least one metal selected from the group consisting of Mn, Ni, Co, and any combination thereof.

The metal salt may be selected from the group consisting of a sulfate, a nitrate, an acetate, a halide, a hydroxide, and any combination thereof. However, the metal salt is not limited thereto, and any water-soluble metal salt commonly used in the art may also be used.

The basic solution may be selected from the group consisting of a Na$_2$CO$_3$ aqueous solution, NaOH, KOH, NH$_4$OH, and any combination thereof.

The metal oxide precursor may be prepared at a pH level of about 11 to about 13. When the pH is controlled within the range described above during preparation of the metal oxide precursor, a high-density co-precipitated metal oxide precursor may be obtained. In this regard, reaction time to obtain the high-density co-precipitated metal oxide precursor may be in the range of about 7 to about 10 hours, and reaction may be performed at a rate of about 500 rpm to about 800 rpm.

A precursor including a lithium compound prepared by mixing the co-precipitated metal oxide precursor and a lithium salt is heat-treated at a temperature of about 800° C. to about 1200° C. to prepare a core.

The lithium salt may include at least one selected from the group consisting of Li$_2$CO$_3$, LiNO$_3$, LiBr, LiCl, LiI, LiOH, Li(CH$_3$CO$_2$), LiH$_2$PO$_4$, LiOH.H$_2$O, Li(CH$_3$CO$_2$).2H$_2$O, and any combination thereof.

For example, the core may be a Li—Ni composite oxide represented by Formula 1 below.

LiNi$_x$(M)$_y$O$_2$     Formula 1

In Formula 1, M includes at least one selected from the group consisting of cobalt (Co), manganese (Mn), chromium (Cr), titanium (Ti), copper (Cu), iron (Fe), aluminum (Al), vanadium (V), and tungsten (W), 0.5≤x≤1.0, and 0≤y≤0.5.

In the Li—Ni composite compound core, as the amount of Ni increases, the heat-treatment temperature decreases within the range described above.

Then, a transition metal hydroxide is applied to the core, and the transition metal hydroxide is heat-treated to form a coating layer on at least one portion of the core. The coating layer may include at least two oxide phases having different structures.

The transition metal hydroxide may be Co(OH)$_2$. An amount of the transition metal hydroxide may be in the range of about 1% by weight to about 10% by weight. For example, the amount of the transition metal hydroxide may be in the range of about 1% by weight to about 5% by weight. When the amount of the transition metal hydroxide is within the range described above, the coating layer may include at least two oxide phases having different structures. Thus, the cathode active material including the transition metal hydroxide may have a stable structure and prevent side reactions between the composite cathode active material and an electrolyte. Accordingly, a lithium battery including the composite cathode active material may have improved battery performance such as high initial capacity, high rate capability, and long lifespan. The transition metal hydroxide may be in the form of particles having an average particle diameter of 1 μm or less.

The composite cathode active material may be prepared by applying the transition metal hydroxide to the core, and heat-treating the transition metal hydroxide at 400° C. or higher, for example, at a temperature of about 400° C. to about 900° C. When the heat-treatment is performed within the temperature range described above, the coating layer may include at least two oxide phases selected from the group consisting of layer-structured LiCoO$_2$ and spinel-structured Li$_{0.49}$CoO$_2$, Li$_{0.5}$Co$_{1.1}$O$_2$, and Co$_3$O$_4$ through reaction between lithium remaining on the surface of the core of the composite cathode active material and the transition metal hydroxide Co(OH)$_2$.

Hereinafter, one or more embodiments will be described in detail with reference to the following examples. These examples are not intended to limit the purpose and scope of the one or more embodiments.

EXAMPLES

Example 1: Preparation of Composite Cathode Active Material

Nickel sulfate (NiSO$_4$, Aldrich Co.), cobalt sulfate (CoSO$_4$, Aldrich Co.), and manganese sulfate (MnSO$_4$, Aldrich Co.) were quantitatively mixed such that a molar ratio of Ni, Co, and Mn was 0.6:0.2:0.2, and pure water was added thereto to prepare a 2.4 M aqueous solution. A 7.5 M NaOH aqueous solution and a 15 M NH$_4$OH solution were added to the aqueous solution, and the solution was continuously mixed in a co-precipitation device. The mixture was subjected to co-precipitation at pH 11 at 40° C. for 8 hours at 700 rpm to prepare $Ni_{0.6}Co_{0.2}Mn_{0.2}(OH)_2$ precursor. The $Ni_{0.6}Co_{0.2}Mn_{0.2}(OH)_2$ precursor was washed with water several times, dried in an oven at 120° C., and filtered. The $Ni_{0.6}Co_{0.2}Mn_{0.2}(OH)_2$ precursor was mixed with $Li_2CO_3$ (Aldrich Co.) in a molar ratio of about 1:1 using a simple mixer. A mixture collected therefrom was added to a crucible and heat-treated under atmospheric conditions at a rate of 2° C./min at 900° C. for 10 hours to prepare a $LiNi_{0.6}Co_{0.2}Mn_{0.2}O_2$ core.

Then, 1% by weight of $Co(OH)_2$ having an average particle diameter of 1 µm or less was mixed with the $LiNi_{0.6}Co_{0.2}Mn_{0.2}O_2$ core, and the resultant was heat-treated at 850° C. for 6 hours to prepare a composite cathode active material including the $LiNi_{0.6}Co_{0.2}Mn_{0.2}O_2$ core and a coating layer formed on the core and including layer-structured $LiCoO_2$ phase and spinel-structured $Li_{0.49}CoO_2$, $Li_{0.5}Co_{1.1}O_2$, and $Co_3O_4$ phases.

Example 2: Preparation of Composite Cathode Active Material

Nickel sulfate ($NiSO_4$, Aldrich Co.), cobalt sulfate ($CoSO_4$, Aldrich Co.), and manganese sulfate ($MnSO_4$, Aldrich Co.) were quantitatively mixed such that a molar ratio of Ni, Co, and Mn was 0.7:0.15:0.15, and pure water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The mixture was subjected to co-precipitation at a pH of 11.5 at 40° C. for 8 hours at 700 rpm to prepare a $Ni_{0.7}Co_{0.15}Mn_{0.15}(OH)_2$ precursor. The $Ni_{0.7}Co_{0.15}Mn_{0.15}(OH)_2$ precursor was washed with water several times, dried in an oven at 120° C., and filtered. The $Ni_{0.7}Co_{0.15}Mn_{0.15}(OH)_2$ precursor was mixed with $Li_2CO_3$ (Aldrich Co.) in a molar ratio of about 1:1 using a simple mixer. A mixture collected therefrom was added to a crucible and heat-treated under atmospheric conditions at a rate of 2° C./min at 850° C. for 10 hours to prepare a $LiNi_{0.7}Co_{0.15}Mn_{0.15}O_2$ core.

Then, 2% by weight of $Co(OH)_2$ having an average particle diameter of 1 µm or less was mixed with the $LiNi_{0.7}Co_{0.15}Mn_{0.15}O_2$ core, and the mixture was heat-treated at 800° C. for 6 hours to prepare a composite cathode active material including the $LiNi_{0.7}Co_{0.5}Mn_{0.15}O_2$ core and a coating layer formed on the core and including layer-structured $LiCoO_2$ phase and spinel-structured $Li_{0.49}CoO_2$, $Li_{0.5}Co_{1.1}O_2$, and $Co_3O_4$ phases.

Example 3: Preparation of Composite Cathode Active Material

Nickel sulfate ($NiSO_4$, Aldrich Co.), cobalt sulfate ($CoSO_4$, Aldrich Co.), and manganese sulfate ($MnSO_4$, Aldrich Co.) were quantitatively mixed such that a molar ratio of Ni, Co, and Mn was 0.8:0.1:0.1, and pure water was added thereto to prepare a 2.4 M aqueous solution. A 7.5 M NaOH aqueous solution and a 15 M $NH_4OH$ solution were added to the 2.4M aqueous solution, and the solution was continuously mixed in a co-precipitation device. The mixture was subjected to co-precipitation at a pH of 12 at 40° C. for 8 hours at 700 rpm to prepare a $Ni_{0.8}Co_{0.1}Mn_{0.1}(OH)_2$ precursor. The $Ni_{0.8}Co_{0.1}Mn_{0.1}(OH)_2$ precursor was washed with water several times, dried in an oven at 120° C., and filtered. The $Ni_{0.8}Co_{0.1}Mn_{0.1}(OH)_2$ precursor was mixed with $Li_2CO_3$ (Aldrich Co.) in a molar ratio of about 1:1 using a simple mixer. A mixture collected therefrom was added to a crucible and heat-treated under atmospheric conditions at a rate of 2° C./min at 800° C. for 10 hours to prepare a $LiNi_{0.8}Co_{0.1}Mn_{0.1}O_2$ core.

Then, 4% by weight of $Co(OH)_2$ having an average particle diameter of 1 µm or less was mixed with the $LiNi_{0.8}Co_{0.1}Mn_{0.1}O_2$ core, and the mixture was heat-treated at 750° C. for 6 hours to prepare a composite cathode active material including the $LiNi_{0.8}Co_{0.1}Mn_{0.1}O_2$ core and a coating layer formed on the core and including layer-structured $LiCoO_2$ phase and spinel-structured $Li_{0.49}CoO_2$, $Li_{0.5}Co_{1.1}O_2$, and $Co_3O_4$ phases.

Comparative Example 1

Preparation of Cathode Active Material

Nickel sulfate ($NiSO_4$, Aldrich Co.), cobalt sulfate ($CoSO_4$, Aldrich Co.), and manganese sulfate ($MnSO_4$, Aldrich Co.) were quantitatively mixed such that a molar ratio of Ni, Co, and Mn was 0.6:0.2:0.2, and pure water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The mixture was subjected to co-precipitation at a pH of 11 at 40° C. for 8 hours at 700 rpm to prepare a $Ni_{0.6}Co_{0.2}Mn_{0.2}(OH)_2$ precursor. The $Ni_{0.6}Co_{0.2}Mn_{0.2}(OH)_2$ precursor was washed with water several times, dried in an oven at 120° C., and filtered. The $Ni_{0.6}Co_{0.2}Mn_{0.2}(OH)_2$ precursor was mixed with $Li_2CO_3$ (Aldrich Co.) in a molar ratio of about 1:1 using a simple mixer. A mixture collected therefrom was added to a crucible and heat-treated under atmospheric conditions at a rate of 2° C./min at 900° C. for 10 hours to prepare a $LiNi_{0.6}Co_{0.2}Mn_{0.2}O_2$ core.

Example 4: Preparation of Lithium Battery

Powder of the composite cathode active material prepared in Example 1 and a carbon conductive agent (denca black) were mixed and a pyrrolidone solution including a polyvinylidene fluoride (PVDF) binder was added thereto to prepare a slurry in which a weight ratio of the active material:carbon conductive agent:binder was 92:4:4.

The slurry was coated onto a 15 µm-thick Al foil by bar coating to a thickness of about 40 to about 50 µm and dried. The dried slurry was further dried in a vacuum at 110° C. to prepare a cathode plate. The cathode plate was pressed by a roll press to prepare a sheet-like cathode for a coin cell.

A coin half cell was prepared using the cathode, a graphite anode having a diameter of 1.6 cm, and an electrolyte prepared by dissolving 1.3 M $LiPF_6$ lithium salt in a mixture of ethylene carbonate, diethyl carbonate, and ethylmethyl carbonate (EC/DEC/EMC) in a volume ratio of 3:4:3.

Examples 5 and 6: Preparation of Lithium Battery

Coin half cells were prepared in the same manner as in Example 4, except that the composite cathode active materials according to Examples 2 and 3 were respectively used instead of the composite cathode active material according to Example 1.

Comparative Example 2: Preparation of Lithium Battery

A coin half cell was prepared in the same manner as in Example 4, except that the cathode active material according to Comparative Example 1 was used instead of the composite cathode active material according to Example 1.

Analysis Example 1: Transmission Electron Microscopic (TEM) Image

The surface of the composite cathode active material according to Example 1 was observed using a transmission electron microscope (TEM, JEOL, JEM-100CXII). The results are illustrated in FIGS. 2A to 2C.

Figure 2A:
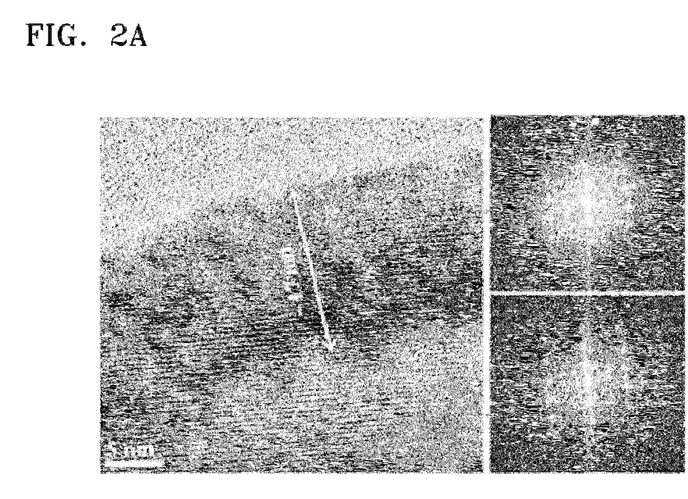
FIGS. 2A to 2C are transmission electron microscopic (TEM) images of a surface of a composite cathode active material according to Example 1.
Figure 2B:
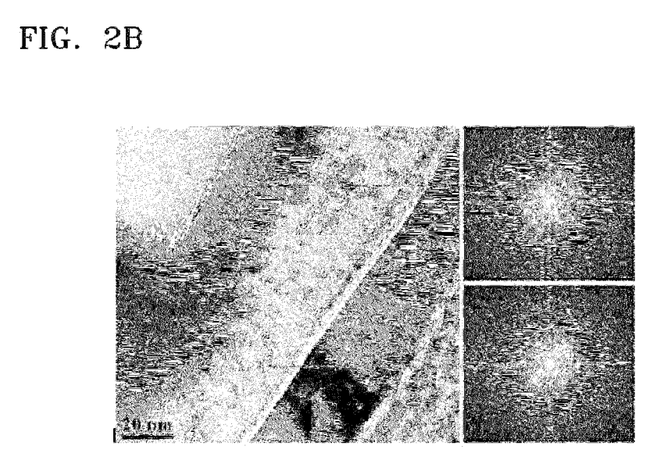
Figure 2C:
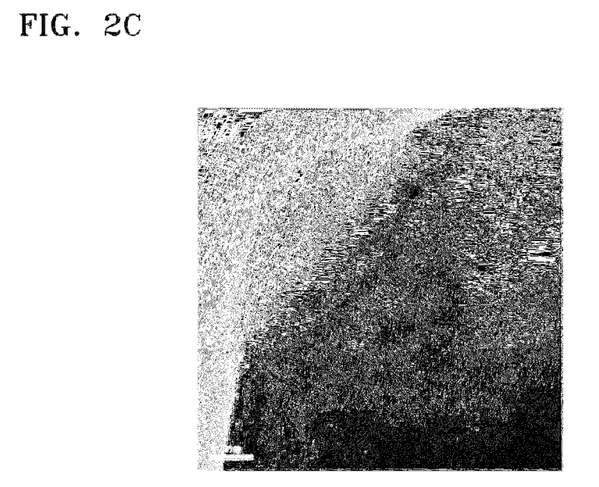

Referring to FIGS. 2A to 2C, it was confirmed that a coating layer including a layer-structured oxide phase, a spinel-structured oxide phase, and a $Co_3O_4$ phase which was not involved in the reaction with remaining lithium on the surface, was formed on the surface of the composite cathode active material according to Example 1. In this regard, composition ratios of the layer-structured oxide phase and the spinel-structured oxide phase were examined using a JCPDS card. The layer-structured oxide phase was $LiCoO_2$, and the spinel-structured oxide phase was $Li_{0.49}CoO_2$ and/or $Li_{0.5}Co_{1.1}O_2$.

Analysis Example 2: Analysis of Amount of Lithium Remaining on Surface of Core of (Composite) Cathode Active Material 30 g of each of the composite cathode active materials or the cathode active material according to Examples 1 to 3 and Comparative Example 1 and 100 g of distilled water were added to a container including a magnetic bar and the mixture was stirred for 30 minutes to obtain a solution. The solution was subjected to pH titration while adding a 0.1 N HCl solution to the solution and the pH titration was terminated when the pH reached a value being equal to and less than 3. Here, a flow rate was controlled such that about 20 to 30 minutes were taken for the pH titration.

The amounts of $Li_2CO_3$ and LiOH remaining on the core of each of the composite cathode active materials or the cathode active material according to Examples 1 to 3 and Comparative Example 1 were measured and calculated using Equation 1 below to obtain the amounts of lithium remaining on the core of the composite cathode active material. The results are shown in Table 1 below.

Amount of residual lithium (% by weight)=[amount of $Li_2CO_3$×(molecular weight of Li/molecular weight of $Li_2CO_3$)+amount of LiOH×(molecular weight of Li/molecular weight of LiOH)]  Equation 1

TABLE 1

|  | $Li_2CO_3$ (% by weight) | LiOH (% by weight) | Amount of residual lithium (% by weight) |
|---|---|---|---|
| Example 1 | 0.04 | 0.02 | 0.013 |
| Example 2 | 0.2 | 0.27 | 0.117 |
| Example 3 | 0.22 | 0.31 | 0.132 |
| Comparative Example 1 | 0.38 | 0.48 | 0.211 |

Referring to Table 1, the amount of lithium remaining on the core of each of the composite cathode active materials prepared in Examples 1 to 3 was less than that of lithium remaining on the core of the cathode active material prepared in Comparative Example 1. Furthermore, it was confirmed that the amount of lithium remaining on the core of each of the composite cathode active materials prepared in Examples 1 to 3 was less than 0.20% by weight.

Evaluation Example 1: Evaluation of Initial Capacity and Rate Capability

The coin half cells according to Example 4 and Comparative Example 2 were charged at a constant current rate of 0.5 C and a constant voltage rate of 4.3 V (0.05 C cut-off) at room temperature (25° C.) and rested for 10 minutes. Then, the coin half cells were discharged at a constant current rate of 0.1 C, 0.2 C, or 1 C until the voltage thereof reached 2.8 V. Initial capacity and rate capability of the coin half cells according to Example 4 and Comparative Example 2 were evaluated while changing the discharge rate at 0.1 C, 0.2 C, and 1 C. The results are shown in Table 2 below.

In this regard, 'C-rate' is a discharge rate of the coin cell and acquired by dividing total capacity of the coin cell by total discharge time. The initial capacity is a discharge capacity at 0.1 C, and the rate capability was calculated using Equation 2 below.

Rate capability (%)=[(discharge capacity at 1 C)/(discharge capacity at 0.1 C)]×100  Equation 2

TABLE 2

|  | Discharge capacity at 0.1 C (mAh/g) | Discharge capacity at 1 C (mAh/g) | Rate capability (%) |
|---|---|---|---|
| Example 4 | 181.2 | 162.1 | 89.5 |
| Comparative Example 2 | 178.2 | 157.6 | 88.4 |

Referring to Table 2, the coin half cell according to Example 4 had higher initial capacity and rate capability than the coin half cell according to Comparative Example 2.

Evaluation Example 2: Evaluation of Lifespan Characteristics

The coin half cells according to Example 4 and Comparative Example 2 were subjected to two cycles of charging and discharging at room temperature to perform a formation. In a first operation of the formation, the coin half cells were charged at a rate of 0.1 C until the voltage reached 4.3 V. Then, in a second operation of the formation, the coin half cells were discharged at a rate of 0.1 C until the voltage reached 2.8 V.

After the formation, a battery was charged in the same manner as described above at a rate of 0.5 C and discharged at a rate of 0.2 C until the voltage reached 2.8 V. These charging and discharging conditions are used as reference conditions for charging and discharging, and a discharge capacity was measured and used as a reference discharge capacity.

Then, the battery was charged in the same manner as described above at a rate of 1 C and discharge at a rate of 1 C until the voltage reached 2.8 V. Then, a discharge capacity (at the first cycle) was measured. Charging and discharging were repeated as described above to respectively measure discharge capacities at each cycle and at the 300th cycle. Discharge capacities per weight were obtained therefrom and capacity retention rates were calculated to evaluate lifespan characteristics of the coin cells prepared according to Example 4 and Comparative Example 2. The results are shown in Table 3 and FIG. 4. Here, the capacity retention rate (%) is obtained using Equation 3 below.

Capacity retention rate (%)=[(discharge capacity per weight at 300th cycle/discharge capacity per weight at the 1st cycle)]×100  Equation 3

TABLE 3

|  | Discharge capacity per weight at the 1st cycle | Discharge capacity per weight at the 300th cycle | Capacity retention rate (%) |
| --- | --- | --- | --- |
| Example 4 | 162.1 | 147.4 | 90.9 |
| Comparative Example 2 | 157.6 | 134.2 | 85.2 |

Figure 4:
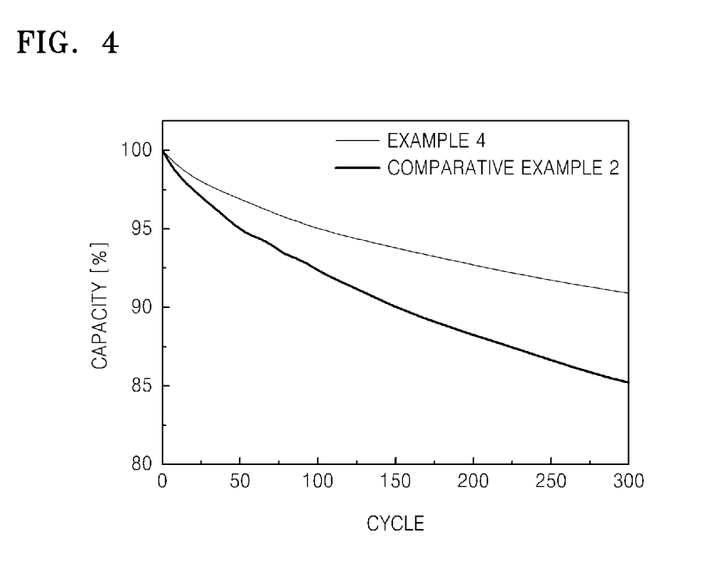
FIG. 4 is a graph of capacity retention rates of lithium batteries according to Example 4 and Comparative Example 2 with respect to the number of charging and discharging cycles.

Referring to Table 3 and FIG. 4, the coin half cell according to Example 4 has a longer lifespan than the coin half cell according to Comparative Example 2.

As described above, according to the one or more of the above embodiments, the composite cathode active material includes a core including a lithium compound and a coating layer formed on at least one portion of the core and including at least two oxide phases having different structures. A cathode and a lithium battery including the composite cathode active material may have a high initial capacity, high rate capability, and long lifespan.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present embodiments as defined by the following claims.

What is claimed is:

1. A composite cathode active material comprising:
a core comprising a lithium compound; and
a coating layer formed on at least one portion of the core,
wherein the coating layer comprises at least two oxide phases having different structures and a spinel-structured oxide phase and a layer-structured oxide phase, and
wherein an amount of lithium remaining on the surface of the core is less than about 0.20% by weight.

2. The composite cathode active material of claim 1, wherein the at least two oxide phases having different structures are formed as islands.

3. The composite cathode active material of claim 1, wherein the coating layer is formed from lithium remaining on a surface of the core and is partially involved in reactions with the at least two oxide phases having different structures.

4. The composite cathode active material of claim 1, wherein the coating layer comprises at least two oxide phases selected from the group consisting of $LiCoO_2$, $Li_{0.49}CoO_2$, $Li_{0.5}Co_{1.1}O_2$, and $Co_3O_4$.

5. The composite cathode active material of claim 1, wherein the core comprising the lithium compound is a Li—Ni composite oxide.

6. The composite cathode active material of claim 1, wherein the core comprising the lithium compound is a Li—Ni composite oxide.

7. The composite cathode active material of claim 1, wherein the core comprising the lithium compound is a Li—Ni composite oxide.

8. The composite cathode active material of claim 1, wherein the core comprising the lithium compound is a Li—Ni composite oxide represented by Formula 1 below:

$$Li_aNi_x(M)_yO_2 \qquad \text{Formula 1}$$

wherein M comprises at least one selected from the group consisting of cobalt (Co), manganese (Mn), chromium (Cr), titanium (Ti), copper (Cu), iron (Fe), aluminum (Al), vanadium (V), and tungsten (W), and
wherein $0.9 \leq a \leq 1.2$, $0.5 \leq x \leq 1.0$, and $0 \leq y \leq 0.5$.

9. The composite cathode active material of claim 1, wherein the core comprising the lithium compound has an average particle diameter of about 1 μm to about 15 μm.

10. A cathode comprising the composite cathode active material according to claim 1.

11. A lithium battery comprising:
a cathode comprising a cathode active material;
an anode comprising an anode active material;
an electrolyte interposed between the cathode and the anode,
wherein the cathode active material comprises the composite cathode active material according to claim 1.

12. The lithium battery of claim 11, wherein the anode active material is a carbonaceous material.

13. A method of preparing a composite cathode active material, the method comprising:
preparing a core comprising a lithium compound; and
forming a coating layer on at least one portion of the core by applying a transition metal hydroxide to the core, and heat-treating the transition metal hydroxide at about 400° C. or higher,
wherein the coating layer comprises at least two oxide phases having different structures.

14. The method of claim 13, wherein the preparing of the core comprising the lithium compound comprises heat-treating a precursor comprising a lithium compound at a temperature of from about 800° C. to about 1200° C.

15. The method of claim 13, wherein the core is a Li—Ni composite oxide represented by Formula 1 below:

$$LiNi_x(M)_yO_2 \qquad \text{Formula 1}$$

wherein M comprises at least one selected from the group consisting of cobalt (Co), manganese (Mn), chromium (Cr), titanium (Ti), copper (Cu), iron (Fe), aluminum (Al), vanadium (V), and tungsten (W), and
wherein $0.5 \leq x \leq 1.0$, and $0 \leq y \leq 0.5$.

16. The method of claim 13, wherein the transition metal hydroxide comprises $Co(OH)_2$.

17. The method of claim 13, wherein the amount of the transition metal hydroxide is from about 1% by weight to about 10% by weight.

18. The method of claim 13, wherein the transition metal hydroxide is formed as particles each having an average particle diameter of 1 μm or less.

19. The method of claim 13, wherein the forming of the coating layer comprises applying the transition metal hydroxide to the core and heat-treating the transition metal hydroxide at a temperature of from about 400° C. to about 900° C.

* * * * *